(12) United States Patent
Lanvin

(10) Patent No.: US 6,986,194 B2
(45) Date of Patent: Jan. 17, 2006

(54) GRIPPING UNIT FOR AUTOMATED MACHINING OF PARTS, AND MACHINING DEVICE AND PROCESS INTEGRATING SUCH A UNIT

(75) Inventor: Hervé Lanvin, Bonnay (FR)

(73) Assignee: Airbus France, Toulouse Cedex (FR)

( * ) Notice: Subject to any disclaimer, the term of this patent is extended or adjusted under 35 U.S.C. 154(b) by 49 days.

(21) Appl. No.: 10/890,747

(22) Filed: Jul. 13, 2004

(65) Prior Publication Data

US 2004/0244182 A1 Dec. 9, 2004

Related U.S. Application Data

(62) Division of application No. 10/304,657, filed on Nov. 25, 2002.

(30) Foreign Application Priority Data

Nov. 26, 2001 (FR) .................................. 01-15262

(51) Int. Cl.
*B23Q 7/00* (2006.01)
(52) U.S. Cl. .......................... 29/563; 29/33 P; 409/165
(58) Field of Classification Search ................ 29/33 P, 29/563; 409/167, 165, 159, 172, 219, 221, 409/225; 269/71
See application file for complete search history.

(56) References Cited

U.S. PATENT DOCUMENTS

| 4,291,388 | A | * | 9/1981 | Ecker et al. ................. 711/103 |
|---|---|---|---|---|
| 4,495,780 | A | * | 1/1985 | Kaneko et al. ............... 62/229 |
| 4,987,834 | A | * | 1/1991 | Peck et al. ................... 104/300 |
| 5,213,192 | A | * | 5/1993 | Kuse ........................... 483/68 |
| 5,412,863 | A | * | 5/1995 | Prodel ........................ 29/33 P |
| 5,582,397 | A | * | 12/1996 | Lanvin ...................... D25/118 |
| 5,781,983 | A | * | 7/1998 | Gruner ........................ 29/563 |
| 6,228,007 | B1 | * | 5/2001 | Quak et al. ................. 409/165 |
| 6,594,765 | B2 | * | 7/2003 | Sherman et al. ............ 713/202 |
| 2003/0200060 | A1 | * | 10/2003 | Eryurek et al. ............. 702/188 |

FOREIGN PATENT DOCUMENTS

GB 2 065 026 A 6/1981

* cited by examiner

*Primary Examiner*—Derris H. Banks
*Assistant Examiner*—Dana Ross
(74) *Attorney, Agent, or Firm*—Thelen Reid & Priest LLP

(57) ABSTRACT

The gripping unit comprises a pallet (16) that supports gripping systems (18) through orientation systems (22). The pallet (16) also supports at least one control box (28) capable of activating orientation systems (22), and possibly gripping systems (18) to modify the position or orientation of the block of material to be machined when the gripping unit is placed in a machine tool (12). The control system (28) takes actions in response to orders issued by the control system (40) of the machine tool (12).

8 Claims, 4 Drawing Sheets

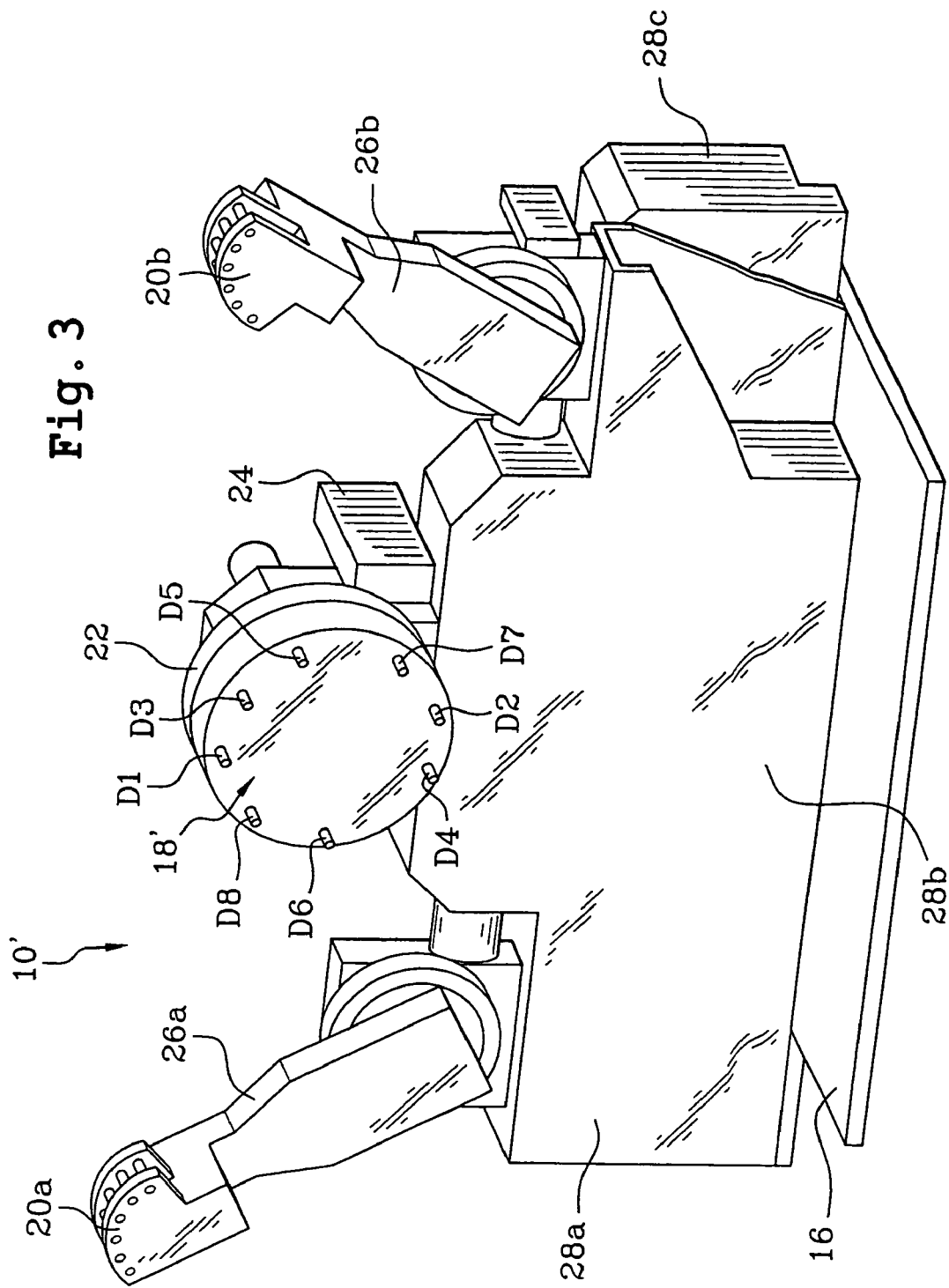

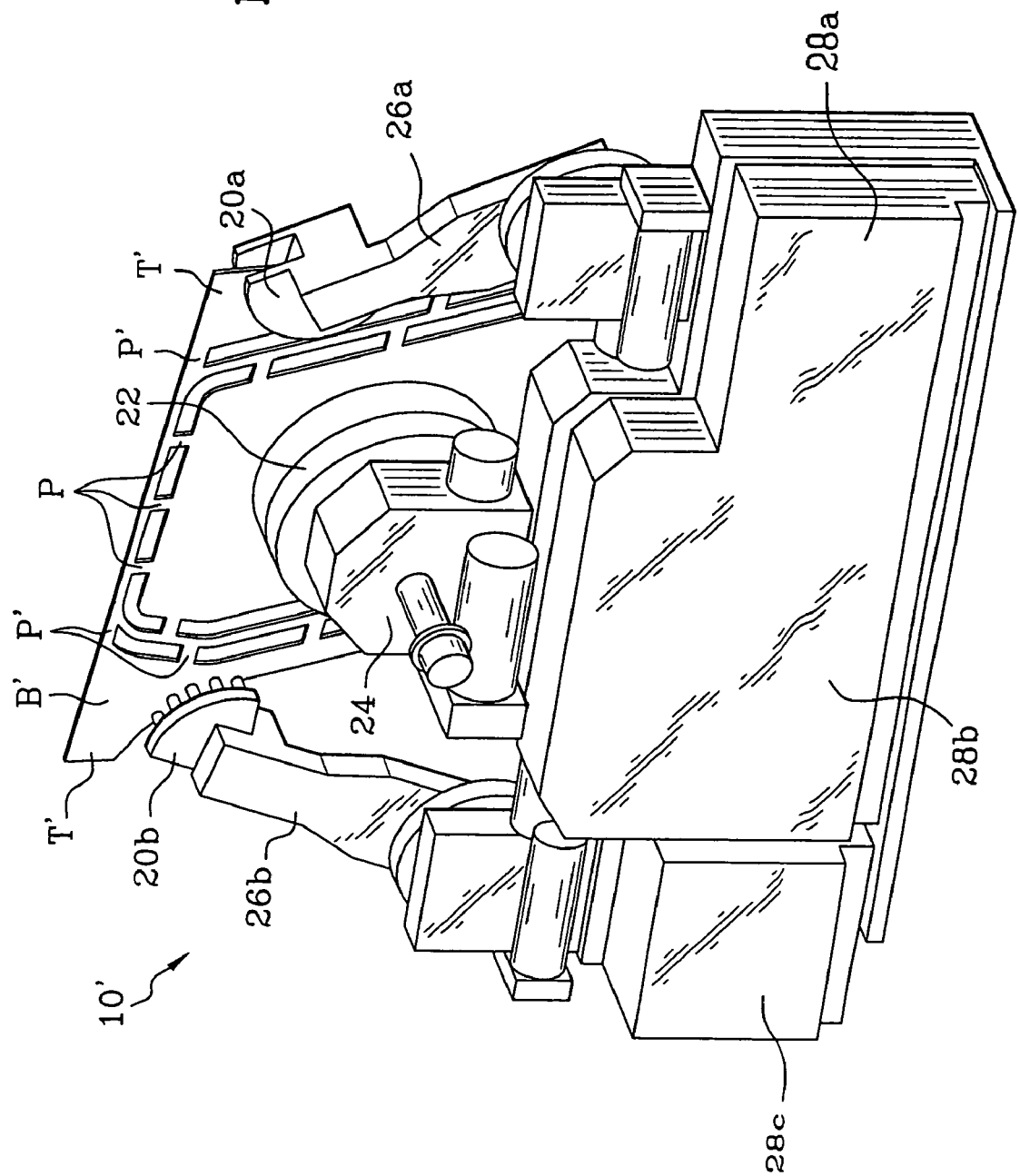

GRIPPING UNIT FOR AUTOMATED MACHINING OF PARTS, AND MACHINING DEVICE AND PROCESS INTEGRATING SUCH A UNIT

CROSS-REFERENCE TO RELATED APPLICATION

This application is a divisional of co-pending application Ser. No. 10/304,657, entitled "Gripping Unit For Automated Machining of Parts, And Machining Device And Process Integrating Such A Unit" by inventor Herve Lanvin, filed on Nov. 25, 2002, which claims priority based on French application serial no. 01-15262, entitled, "Gripping Unit For Automated Machining Of Parts, And Machining Device And Process Integrating Such A Unit" by inventor Herve Lanvin filed on Nov. 26, 2001

TECHNICAL DOMAIN

The main purpose of the invention is a gripping unit used to transfer a mechanical part to be machined between at least one machine tool and at least one loading unloading station, to enable automated machining of the said part on each of its faces without the need for action by an operator during the machining.

The invention also relates to a machining device integrating at least one gripping unit of this type, at least one machining machine and at least one loading unloading station.

The invention also relates to a machining process that could be used by such a device.

STATE OF THE ART

Normally, when a part has to be machined in a machine tool, an operator can put it into position in a specific gripping tool, directly fixed onto the plate of the machine tool. A relative long stoppage of the machine is necessary to put the tooling into place and to adjust it, which reduces productivity. This productivity reduction is particularly severe because the part usually needs to be turned over to be able to machine all the faces of the part. Furthermore, when the part is being turned over, the gripping tool sometimes needs to be replaced by another tool better adapted to the new orientation of the part.

Document FR-A-2 691 659 describes a gripping tool with a modular design, used to put the part into place and to adjust the orientation outside the machine tool, for example at a loading station. The gripping tool comprises a sole plate, in other words a pallet composed of a rectangular plate designed to be fixed on the plate of the machine tool. A vertical body fixed to this pallet can be fitted with at least one gripping module. This gripping module is chosen from among different modules (vices, grips, etc.), that can be interchanged with each other depending on the part to be machined.

The part to be machined is put into place on the gripping module in a loading station outside the machine. The operator selects the gripping module so as to clamp the part in the required position. Consequently, the loading station supplies hydraulic fluid to the gripping module under pressure. The gripping module comprises a reservoir of pressurized hydraulic fluid to keep the part clamped in place during the waiting and transfer phases between the loading station and the machine tool.

The gripping tool proposed in document FR-A-2 691 659 is used to put parts into position in advance, without requiring a long stoppage of the machine. However, when the part must be turned over to machine some of its faces, the gripping tool must be brought to the loading station so that an operator can turn the part over, and if necessary replace the gripping module. This is penalizing in terms of productivity and the manufacturing time for the part. The machine tool is stopped while the tooling is removed and put back into place. Furthermore, action by an operator is necessary.

DESCRIPTION OF THE INVENTION

The main purpose of the invention is a gripping unit with an innovative design such that all faces of a mechanical part can be machined in an automated manner without the need for any action by an operator or return to a loading station.

According to the invention, this objective is achieved by means of a gripping unit that can be transferred between at least one machine tool and at least one loading unloading station, to enable automated machining of at least one part, the gripping unit comprising a pallet and means of gripping the said part, mounted on the pallet, and being characterized in that it also comprises orientation means used to mount the gripping means on the pallet, control means capable of actuating the orientation means in response to control signals output from the machine tool, and bearing means installed on the pallet by other orientation means.

In this type of gripping unit, the instrumentation control device in particular checks the position and movements of orientation means by which the gripping means are mounted on the pallet. This check is made locally and independently, as a function of set points originating from the machine tool. Therefore, the part can be machined on each of its faces in sequence without it being necessary to return the gripping unit to the loading unloading station. Complete automated machining is thus possible without increasing the workload carried out by the control device installed on the machine tool.

In one preferred embodiment of the invention, the control means are also capable of actuating gripping means. Thus, the block of material to be machined can be clamped and the machined part can be disassembled automatically at the loading unloading station.

According to this preferred embodiment, at least one frame is fixed on the pallet and a rotary plate is installed on the frame and forms the orientation means. The gripping means are then installed on the rotary plate.

The support means preferably include at least one surface that might be applied on the part, the said surface being made of a material that absorbs vibrations. Furthermore, the other orientation means comprise another rotary arm installed on the pallet.

In the preferred embodiment of the invention, the gripping means are interchangeable.

Advantageously, the pallet comprises a part free to move in rotation about an axis perpendicular to a face of the pallet with the larger surface area, the gripping means being mounted on the said mobile part. This arrangement gives an additional degree of orientation, which in some cases facilitates machining of all faces of the block of material.

In one particular embodiment, the gripping unit also comprises first connection means that can be automatically connected to the two connection means mounted on the machine tool when the modular unit is fitted into the machine tool.

Advantageously, the modular unit then includes third connection means connected firstly to the first connection means and secondly to the orientation means and control means.

In general, the control means are preferably connected to a communication bus capable of transmitting the control signals. This solution has the advantage that it only requires the exchange of a very limited number of signals between the control means and the machine tool. Advantageously, the communication bus then uses a wireless link.

In the preferred embodiment of the invention, the gripping unit also comprises at least one onboard energy reserve. This energy reserve at least clamps the block of material to be machined in the gripping means, during transfers of the gripping unit between the loading unloading station and the machine tool, when the said gripping means have to be permanently powered.

In this case, the energy reserve may be sized to supply the quantity of energy necessary for complete machining of an arbitrary part on the machine tool.

According to a preferred improvement of the invention, the gripping means may exert a tension force on the part, to modify its natural frequency and thus limit vibrations of the part during machining.

Preferably, vibration detection means are then installed on at least one of the gripping means. Signals output by vibration detection means are then advantageously transmitted to control means that regulate the tension force exerted on the part, to minimize its vibrations.

Furthermore, the control means may be placed in at least one airtight box that can protect them from any aggressions that may be applied to them when the part is machined on the machine tool. Heat extraction means are then installed on the box if necessary.

Another purpose of the invention is a part machining device, comprising at least one gripping unit like that described above, at least one machine-tool on which the gripping unit is held, at least one loading unloading station in which then gripping unit will be held, and means capable of transporting energy to the gripping unit, in which each machine tool also comprises second control means capable of sending the said control signals, and signal transmission means are provided to transmit the said control signals between the control means for the gripping unit and the second control means, when the gripping unit is held on the machine tool.

Another purpose of the invention is a process for machining parts using a device like that described above, comprising the following phases:

a design phase consisting of defining successive orientations of a part in the machine tool and machining sequences specific to each of these orientations:
a manufacturing phase comprising the following steps:
  placement of the gripping unit at the loading unloading station;
  placement of gripping means on the gripping unit;
  placement of a block of material to be machined on the gripping unit and clamping of the said block by the gripping means;
  transfer and placement of the gripping unit on the machine tool;
  orientation of the said block in a first of the predefined orientations, when acted upon by orientation means controlled by the gripping unit control means at the request of the second control means;
  execution of machining sequences corresponding to this first position;
  repetition of the block orientation and machining sequence execution steps as many times as necessary, in accordance with the design phase, until the part is completed;
  transfer of the gripping unit to the loading unloading station;
  loosening and unloading the part.

BRIEF DESCRIPTION OF THE DRAWINGS

We will now describe the different embodiments of the invention as illustrative and non-restrictive examples, with reference to the attached drawings in which:

FIG. 3 is a perspective view comparable to FIG. 2, illustrating a second embodiment of a gripping unit conform with the invention, and on which there is no part; and FIG. 4 shows the gripping unit in FIG. 3 while machining is taking place, seen from the side opposite to the side used in FIG. 3.

DETAILED PRESENTATION OF PREFERRED EMBODIMENTS OF THE INVENTION

Figure 1:
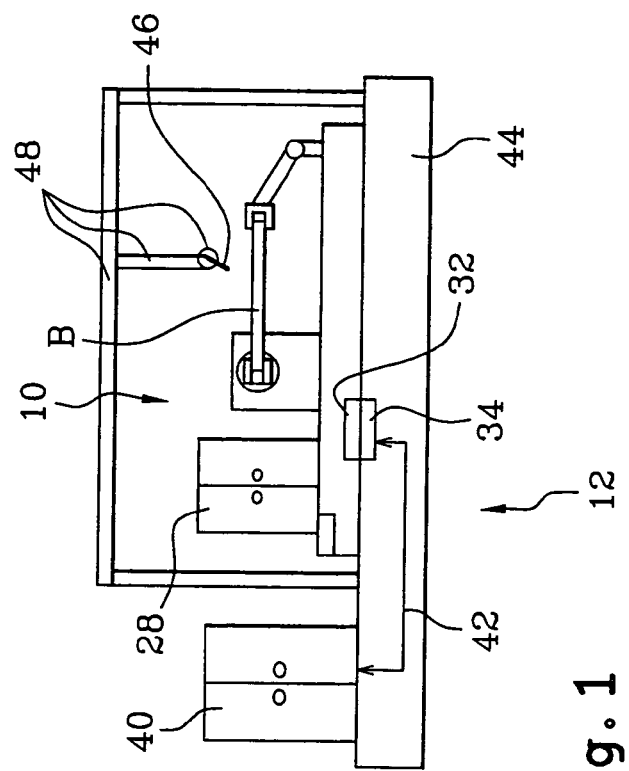
FIG. 1 is a front view that diagrammatically shows a machining device integrating a gripping unit conform with the invention.
Figure 1:
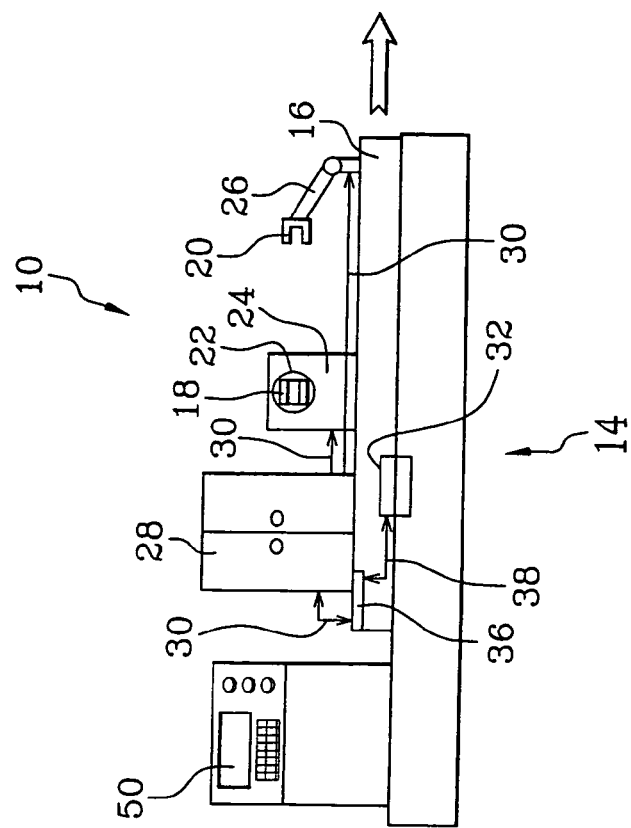

As illustrated diagrammatically in FIG. 1, a device for machining parts conform with the invention comprises at least one gripping unit 10 capable of gripping one or several parts to be machined, at least one machine tool 12 designed to hold the gripping unit in order to do programmed machining of the part, and at least one loading unloading station capable of holding the gripping unit, in particular so that the part can be loaded and unloaded.

In the simplest configuration diagrammatically illustrated in FIG. 1, the device comprises a single gripping unit 10, a single machine tool 12 and a single loading unloading station 14 used both for loading the material block to be machined and for unloading the machined part.

On the other hand, the invention also relates to a "machining center" type device, including several machine tools, one or several gripping units, one or several loading-unloading stations and at least one device for conveying gripping units between the loading unloading station(s) and the different machines.

The device according to the invention may also have any intermediate configuration between these two extreme configurations. Thus, in particular the blocks of material to be machined can be loaded and machined parts can be unloaded at different stations, usually similar to each other. For simplification purposes, these two stations are called "loading unloading stations" throughout the rest of the text.

As can also be seen in FIG. 1, the gripping unit 10 comprises a pallet 16 that is in the form of a plate, preferably made of metal.

In the embodiment diagrammatically shown in FIG. 1, the plate forming the pallet 16 is a monoblock plate.

In one variant embodiment not shown, the pallet 16 may also comprise a lower part and an upper part free to move in rotation on the lower part, about an axis perpendicular to the face of the pallet with the largest surface area, in this case its horizontal top face. The lower part is then designed to be fixed in place on the plate 44 of the machine tool 12 by any appropriate means. In the case shown in which the largest face of the pallet is horizontal, the rotation axis of the upper part is vertical.

The pallet 16 acts as a support to gripping means 18, which are usually associated with bearing means 20. These means 18 and 20 are interchangeable and adapted to the part to be machined.

The gripping means 18 and the bearing means 20 may in particular be composed of vices, grips, etc. In case of bearing means 20, it may also consist of specific means with at least one area that bears on the part being machined, in order to absorb and therefore to limit vibrations of the part that could be caused by machining it. In some cases, the bearing surface of the bearing means 20 may be made from a soft material or a material with good vibration absorption capacity such as rubber.

In the embodiment illustrated in FIG. 1, the gripping means 18 is mounted on a rotary plate 22 supported by a frame 24 fixed on the plate forming the pallet 16. More precisely, the axis of rotation of the plate 22 in this case is parallel to the top face (in this case horizontal) of the said plate. However, this arrangement is only given as an example, the nature and the possibilities of orientation of the gripping means 18 being chosen as a function of the specific characteristics of the part to be machined.

Similarly, in the embodiment illustrated as an example in FIG. 1, the bearing means 20 are mounted on the plate forming the pallet 16 through a rotary arm 26 capable of being pivoted about an axis parallel to the top face (in this case horizontal) of the said plate, this pivoting axis in this case being orthogonal to the axis or rotation of the plate 24.

The rotary plate 22 and the rotary arm 26 thus form orientation means for gripping means 18 and for bearing means 20. Obviously, the number of gripping means 18 and bearing means 20 (if any) depends on the shape and dimensions of the part to be machined.

The pallet 16 also supports the first control means 28. These control means 28 are connected to actuators (not shown) of orientation means composed of the rotary plate 22 and the rotary arm 26 in the embodiment shown. They are usually also connected to actuators (not shown) of gripping means 18 and bearing means 20.

In the preferred embodiment of the invention, the first control means 28 are integrated in at least one sealed box (not shown). This box can then protect the control means from any aggression applied to it when the part is being machined in the machine tool 12 (projections of swarf, lubrication fluid, etc.). When necessary, heat dissipation means (not shown) such as a ventilation device or an air conditioning device, are provided in the box.

The actuators installed on the gripping unit 10 may be of different natures, without going outside the scope of the invention. Thus, these actuators may be controlled by a hydraulic fluid under pressure, or compressed air, a vacuum, an electrical power supply, etc.

In the embodiment shown diagrammatically in FIG. 1, the pallet 16 is equipped with first connection means 32 designed to be automatically connected to second complementary connection means 34 for the machine tool 12. These second connection means may for example be installed on the plate 44 of the machine tool 12.

When they are connected, the connection means 32 and 34 firstly supply energy to actuators installed on the gripping unit 10 from energy sources available on the machine tool, and secondly control an exchange of signals between the gripping unit and the machine tool. The transmission between the machine tool 12 and the gripping unit 10 will be made through pipes and/or cables depending on the nature of the energy used.

More precisely, signals are transmitted between the first control means 28 installed on the gripping unit 10 and the second control means 40 installed on the machine tool 12. For example, this transmission may be made through cables 42, on the machine tool.

In the embodiment shown in FIG. 1, the pallet 16 is also equipped with third connection means 36. These third connection means 36 are connected to the first connection means 32 through lines 38 such as pipes and/or cables that transmit energies and signals. The third connection means 36 are connected to the first control means 28 and to the different actuators for example used on gripping means 18, bearing means 20, the rotary plate 22 and the rotary arm 26, in the embodiment shown. In this case, this transmission passes through lines 30 such as pipes or cables.

In one preferred embodiment of the invention, the gripping unit 10 comprises at least one energy reservoir (not shown), for example such as a reservoir of hydraulic fluid under pressure, a compressed air reservoir, a vacuum accumulator, an electrical power supply battery, etc. This arrangement enables the gripping means 18 and the bearing means 20 to continue to perform their clamping function when the gripping unit 10 is being transferred between the machine tool 12 and the loading unloading station 14, if the said clamping function requires a continuous energy supply.

In one variant of this preferred embodiment of the invention, the gripping unit 10 comprises onboard reservoirs for each energy used on this unit. These reservoirs are filled when the gripping unit 10 is at the loading unloading station. Their capacity is determined such that the gripping unit has sufficient energy to completely finish machining of a part. This arrangement eliminates the need for any energy transmission through the connection means 32 and 36.

In one preferred embodiment of the invention, signals are transmitted between the control means 28 and 40 by means of a communication bus such as a "Profibus" or "Modbus" or other type of industrial field bus. This solution has the advantage that only a very limited number of signals needs to be exchanged between the control means 28 and 40. This increases reliability and reduces manufacturing costs.

In one variant of this embodiment, communication between the control means 28 and 40 passes through a communication bus using a wireless link, for example such as a radio or infrared or other link. This arrangement has the advantage that no signals need to be transmitted through the connection means 32 and 36.

When this variant is combined with the presence of a reservoir on the gripping unit 10 for each of the energies used on the gripping unit, the connection means 32 and 36 may be completely eliminated.

As mentioned above, the first control means 28 onboard gripping unit 10 in particular check the position and movements of the orientation means materialized by the rotating plate 22 and the rotating arm 26 in FIG. 1, as a function of setpoints output from the second control means 40 installed on the machine tool.

This arrangement is advantageous, since it enables use of setpoints locally and independently on the gripping unit 10, without the need for the control means 40 of the machine tool to check the orientation means. This type of control would have the disadvantage that the workload on the control means 40 would be increased, and many connections would be necessary (control signals, sensors, etc.) between these control means 40 and the orientation means materialized by the rotating plate 22 and the rotating arm 26. This would increase the manufacturing cost and the risk of failure.

The machine tool 12 is a high speed machining machine capable of performing machining operations, for example such as cutting, reaming, drilling, slicing operations, etc. It comprises the plate 44 on which the pallet 12 of the gripping unit 10 may be fixed. As already mentioned, the plate 44 comprises connection means 34 capable of being connected onto connection means 32 of the gripping unit 10. When they are connected, the connection means 32 and 34 supply the energies necessary to the gripping unit 10 for its operation, and transmit signals between the first control means 28 and the second control means 40. In particular, the first control means 28 may receive orders from the second control means 40.

Conventionally, the machine tool 12 comprises at least one tool 46 and means 48 capable of displacing, orienting and activating this tool.

The use of the gripping unit 10 conform with the invention modifies the position, orientation and possibly the grip of the part during machining. This thus optimizes machining conditions by applying the best possible configuration to the relative orientation between the tool and the part, regardless of the face of the part being machined.

More precisely, modifications to the position, orientation and possibly gripping of the part are made in the machine tool, where they are controlled by the first control means 28 of the gripping unit 10, which receives appropriate orders from the second control means 40 installed on the machine tool 12. This is very advantageous since the above mentioned operations can thus be carried out without any action by an operator and without the need to transfer the gripping unit to the loading unloading station 14. Productivity is consequently improved.

As can also be seen in FIG. 1, the loading unloading station 14 is equipped with at least one energy source capable of supplying energy to the gripping unit 10 when it is at this station.

Furthermore, the loading unloading station 14 includes third control means 50. When the gripping unit 10 is held at the loading unloading station 10, the third control means 50 are connected to the first control means 28 through connection means 32 and 36.

In practice, the third control means 50 are in the form of an operator dialogue desk. This desk comprises at least one display means, for example such as the screen and/or lights and at least one input means, for example such as a keyboard and/or push buttons.

As has already been mentioned, the machining device may also comprise one or several conveying means capable of routing each gripping unit 10 between the machine tool 12 and the loading unloading station 14.

Any mechanical parts can be machined using a machining device like that described above, using a machining process that will now be described.

Firstly, this process comprises a design phase during which a programmer defines the operational machining process. More precisely, the programmer defines the various orientations that must be applied to the block of material to be machined, and the various machining sequences corresponding to each of these orientations. In particular, these machining sequences include changes to the position and orientation of the tool, its displacements and tool changes, if any. The definition of successive orientations of the block of material to be machined consists of making changes to the orientation and/or gripping of the said block.

If a series of identical parts has to be produced, the design phase is common to all parts.

The machining process then comprises a manufacturing phase. When several identical parts have to be made, this manufacturing phase is repeated for each part.

During a first step in the machining process phase, a gripping unit 10 is brought to the loading unloading station 14.

An operator then puts gripping means 18, and possibly bearing means 20 adapted to the part to be machined such as one or several vices, grips, etc., into place on this gripping unit. These different gripping and bearing means are interchangeable and can therefore be replaced quickly as a function of the type of part to be machined, such that this operation does not reduce productivity.

In a first embodiment, this operation is done entirely manually. The operator unlocks the gripping means already in place and removes them from their support by a mechanical action. He then puts the gripping means adapted to the part to be machined into place, and then locks them in position by a new mechanical action.

In another embodiment, the operator carries out unlocking and then locking operations on the gripping means by acting on input means on the desk forming the third control means 50, so as to formulate a request on the first control means 28. The control means 28 then control the actuators to perform the required operations.

The operator then positions a block of rough material from which the part to be made has to be machined, in the gripping unit 10. The position and orientation of this block correspond to the position and orientation that were defined previously during the design phase.

Consequently, an appropriate support may be placed on a fixed part of the gripping unit 10, such as the pallet 16, in order to position the block of material and hold it in place in this position until it is gripped by the gripping means 18. The operator then acts on the desk input means forming the third control means 50, in order to make a query to the first control means 28 to actuate the gripping means 18 and possibly the bearing means 20. The block of material can thus be clamped in the required position and orientation.

The gripping unit is then removed from the loading unloading station, after the energy supply line and the signal transmission line have been disconnected.

Depending on the scheduling and planning of workshop tasks, the gripping unit 10 may be brought either into a temporary storage area, or brought directly into the appropriate machine tool 12.

When the gripping unit 10 reaches the plate 44 of the machine tool 12, the pallet 16 is placed on the plate 44 and is fixed to it. The connection means 32 and 34 are then connected to make appropriate connections for energies and signals.

The part is then machined following sequences previously defined during the design phase. More precisely, the sequences relative to each orientation of the part are executed in turn, each sequence being followed by a change to the part orientation achieved by taking action on the orientation means and/or on the gripping means. These various operations are controlled by control means 28 of the gripping unit, in response to orders originating from control means 40 of the machine tool 12. Thus, the part can be completely machined fully automatically without returning the gripping unit to the loading unloading station, under optimum cutting and swarf removal conditions.

Once machining is finished, the gripping unit 10 is disconnected and removed from the machine tool 12, and is then transferred either to a waiting position, or to a loading unloading station. The loading unloading station may be but is not necessarily coincident with the station 14 assigned to loading the block of material to be machined, depending on the configuration of the workshop.

When the gripping unit is at the loading unloading station, an operator acts on the desk input means that materialize the third control means 50. These means then formulate a request so that the first control means 28 activate the gripping means 18 and possibly the bearing means 20, to release the part.

Figure 2:
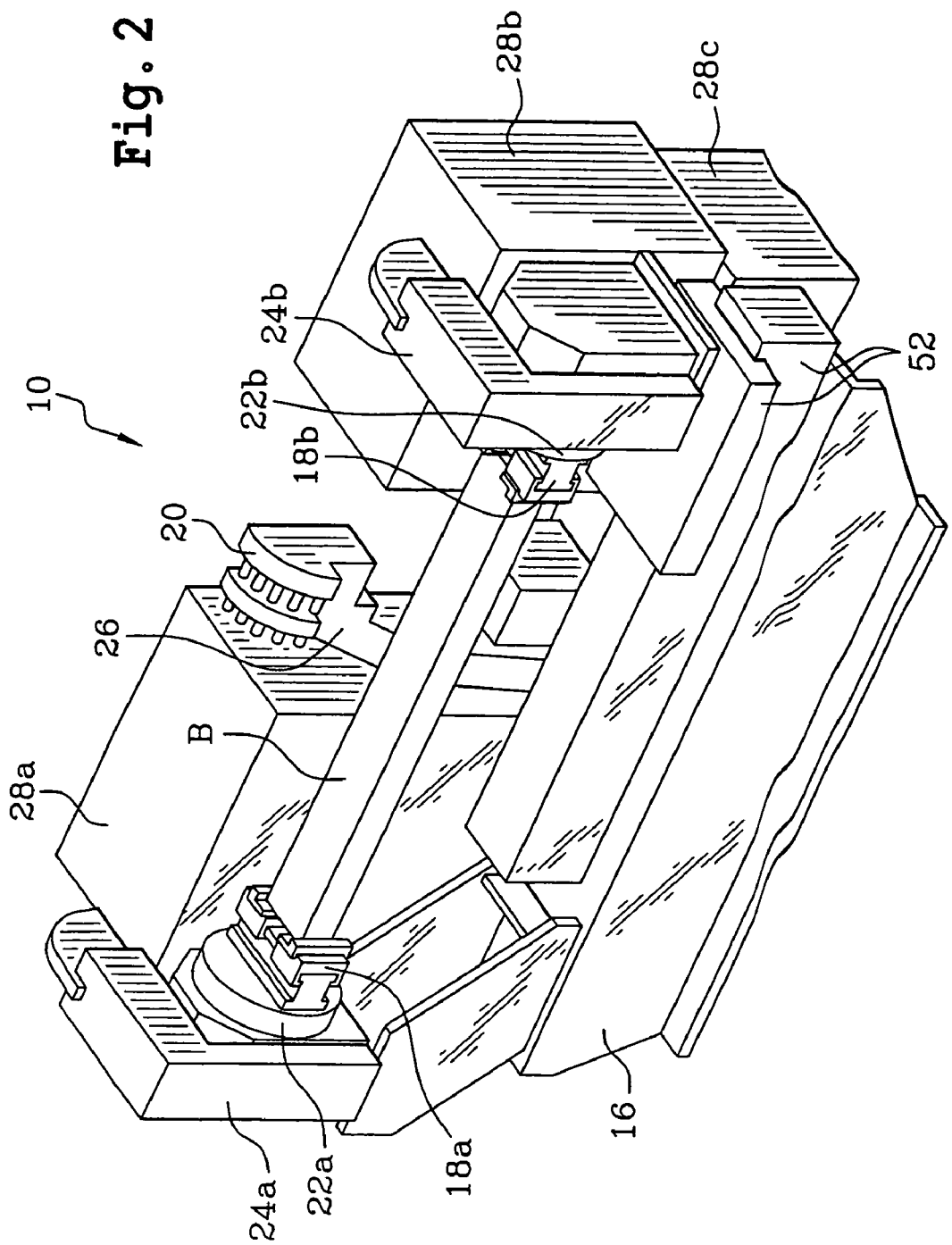
FIG. 2 is a perspective view that shows a first embodiment of a gripping unit conform with the invention, and gripping of a block of material to be machined, in more detail.

We will now describe a first embodiment of the gripping unit according to the invention, with reference to FIG. 2.

In this embodiment, the gripping unit 10 is arranged to machine a block of material B in an elongated and approximately parallelepiped shape. In particular, this block B may be an aluminum block.

As described above, the gripping unit 10 comprises a pallet 16, of which only the top rotating part is shown. In the example described, the rotating part of the pallet 16 may rotate by 285° about a vertical axis.

The pallet 16 supports the fixed frame 24a of a rotating plate 22a equipped with gripping means, in this case consisting of a vice 18a. Furthermore, a second vice 18b is installed on a second rotating plate 22b supported on a mobile frame 24b. This mobile frame 24b is installed on the pallet 16 so that it can be moved towards the fixed frame 24a and moved away from it, along a direction passing through an axis common to the two rotating plates 22a and 22b, through translation means 52. The pallet 16 also supports a rotating arm 26 on which a grip 20 is installed materializing the bearing means placed between frames 24a and 24b. In the example described, the rotating plates 22a and 22b are of the "Reiseler" AWU355 type with encoders and there are 360 000 possible positions on one turn.

In this case, the first control means are located in three boxes 28a, 28b and 28c. The first box 28a may for example be assigned to the energy supply and to filters. The second box 28b in particular contains a programmable logic controller, an interface with a "Profibus" type communication bus, and regulation cards. For example, the third box 28c is a hydropneumatic box particularly containing solenoid valves.

The gripping unit 10 in FIG. 2 communicates with the control means 40 of the machine tool 12 (FIG. 1) through a "Profibus" type communication network.

The translation means 52 can be used to adjust the relative position of the rotating plate 22b with respect to the rotating plate 22a, so that the block of material B in which the part is machined is firmly gripped between vices 18a and 18b.

When the gripping unit that has been described with reference to FIG. 2 is transferred to the loading unloading station 14, an operator puts the vices 18a and 18b into place on the rotating plates 22a and 22b and the clamp 20 into place on the rotating arm 26.

The operator then adjusts the position of frame 24b supporting the vice 18b in translation, such that the distance between the vices 18a and 18b is compatible with the length of the block of material B to be machined. This adjustment is made by adjusting the control means 50 of the loading unloading station 14 on the desk, the said desk being connected to the logic controller contained in the box 28b on the gripping unit.

The operator also adjusts the positions of the plates 22a and 22b in rotation, and consequently the position of the vices 18a and 18b so that the block of material B can be placed between the said vices such that they are correctly aligned and do not create any torsion when the block of material is then clamped in the vices.

The operator then puts a support (not shown) into place on the pallet 16. He then has the block of material B on the said support and positions it such that its ends are placed between the jaws of the vices 18a and 18b. By acting on the desk materializing the control means 50, the operator activates the jaws of the vices in order to clamp the block of material B. This block of material is then held in position by vices 18a and 18b and the operator can remove the previously mentioned support.

The gripping unit 10 is then conveyed to the machine tool 12. The gripping unit 10 may also be transferred to a temporary storage area while waiting to be routed to the machine tool, depending on the scheduling of tasks in the workshop.

In the machine tool, the block of material to be machined is presented in front of tool 46 in a position to give the best cutting and swarf evacuation conditions. Consequently, the control means 40 of the machine tool 12 can send a change position or change orientation order for the block of material B to the logic controller contained in the box 28b, through the "Profibus" network.

This position or orientation change may be obtained by ordering a rotation of the top part of the pallet 16 and/or simultaneous rotation of plates 22a and 22b. These plates must be activated so as to avoid generating torsion on the block of material. Consequently, a first solution consists of driving the two plates in rotation synchronously. Another solution consists of only applying a motor drive to one of the plates, the second plate being free in rotation.

As already mentioned, a tension force may be applied to the block of material B being machined. This force is then applied along the longitudinal axis of the said block, by taking action on the displacement device 52. The resonant frequency of the material block B is thus modified so as to limit the vibrations.

Once the position has been changed, the logic controller contained in the box 28b sends a message to the control means 40 of the machine tool 12 through the "Profibus" network in order to inform it that this operation has been completed. The control means 40 can then control execution of the following machining steps.

In this way, the part held in place by vices 18a and 18b can be machined on all its faces. Thus, the end faces of the part, approximately perpendicular to the axis of rotation common to plates 22a and 22b, may be machined provided that tabs are left between the said part and the portions of the material block clamped between the jaws of vices 18a and 18b. These tabs may be sawn after the part is disassembled at the loading unloading station. They may also be cut by an appropriate tool on the machine tool, the finished part then being picked up by the clamp 20 located at the end of the rotating arm 26. The finished part is then held in position by clamp 20 and residues from the ends of the block B are held in position by clamps 18a and 18b.

Once machining is finished, the gripping unit is taken out of the machine tool 12 and is transferred to the initial loading unloading station or to another similar station. An operator then controls release of the part using gripping means 18a, 18b or 20. Consequently, he makes a request to the logic controller contained in the box 28b, by taking action on the desk that materializes the control means 50.

We will now describe a second embodiment of the gripping unit according to the invention, with reference to FIGS. 3 and 4.

In this embodiment, the gripping unit 10' is arranged to machine a block of material B' in the form of an approximately flat plate, to make a part such as a frame for an aircraft windshield.

As illustrated particularly in FIG. 3, the gripping unit 10' comprises a pallet 16 supporting the frame 24 of a rotating plate 22 on which gripping means 18' are installed. The pallet 16 also supports two gripping arms 26a and 26b on which clamps 20a and 20b are installed, and three boxes 28a, 28b and 28c in which the control means are fitted, in the same way as in the embodiment described above with reference to FIG. 2. As before, the gripping unit 10' communicates with the control means 40 of the machine tool 12 through a "Profibus" network.

The gripping means 18' are in the form of eight pins D1 to D8 distributed on a circle centered on the axis of the rotating plate 22, to project on the front face of the said plate. More precisely, the diametrically opposite pins D1 and D2 are rods fixed to the rotating plate 22. The diametrically opposite pins D3 and D4 are gripping pins that can move parallel to the axis of the rotating plate 22. Each of the pins comprises an expansion-mandrel installed on a jack rod, to achieve this. Finally, pins D5 to D8 are fixed gripping jacks, in other words they each comprise an expansion mandrel installed on a rod fixed to the rotating plate 22.

Eight holes are drilled in the central part of the plate forming the block of material B' to be machined, arranged in the same way as the eight pins D1 to D8.

When the gripping unit 10' is at the loading unloading station 14, an operator puts the pins D1 to D8 forming the gripping means 18' into place on the rotating plate 22. He also puts the clamps 20a and 20b into place on the rotating arms 26a and 26b.

The operator then puts the block of material B' into position on the gripping means 18', by inserting pins D1 to D8 into the holes formed in the said block. The fixed pins D1 and D2 then act as guides.

The operator then controls expansion of the mandrels installed on pins D3 and D4 in the corresponding holes of the block of material B', in order to hold this block in position. He does this on the desk materializing the control means 50 of the loading unloading station 14, the said desk being connected to the control means of the gripping units 10'.

The operator then controls withdrawal of the two jacks installed on pins D3 and D4, to force the material block B' into contact with the rotating plate 22, to give better support. Advantageously, sensors detect that the block of material is actually in firm contact with the plate. The mandrels of the four other pins D5 to D8 are then expanded in their corresponding holes in order to complete gripping of the material block B'.

The operator then controls conveying of the gripping unit 10' towards the machine tool or to a temporary storage area, as was described above with reference to FIG. 2.

In the machine tool, the part is presented in front of tool 46 in a position used to obtain the best cutting and swarf evacuation conditions. As in the previous embodiment, this is achieved by the control means 40 of the machine tool 12 sending an order to change position or change orientation of the material block to the logic controller contained in the box 28b, through the "Profibus" network. The position or orientation change may be made by controlling rotation of the top part of the pallet 16 and/or rotating the plate 22 on which pins D1 to D8 are installed. Action can also be taken on the rotating arms 26a and 26b, in order to obtain a good grip of the block of material to minimize vibrations.

Once the position and/or orientation change has been made, the logic controller contained in the box 28b sends a message to the control means 40 of the machine tool 12, through the "Profibus" network in order to inform the machine tool that this operation is complete. The control means 40 of the machine tool 12 can then control the actual machining steps.

A first step of the machining preferably consists of making a set of tenons T' around the periphery of the plate forming the block of material B' to be machined. These tenons T' are designed to enable a better grip of the said block by clamps 20a and 20b later on. While the tenons T' are being machined, the block of material B' is held only by the gripping means 18'.

The block of material B' can then be machined on all its faces, and it can be gripped by pins D1 to D8 and by clamps 20a and 20b.

Tabs of material P are left in place between the central unmachined part fixed to the plate 22 and the part itself as shown in FIG. 4, so that the block B' can be oriented in rotation for as long as possible using the rotating plate 22 and to minimize deformations during machining. These tabs P may be cut using an appropriate tool, on the machine tool 12, once machining is finished. The tabs P can also be cut later, once the part has been removed from the gripping unit.

Similarly, the tabs P' are also left between the tenons T' and the part, so that the part can be held in place by clamps 20a and 20b. These tabs P' are cut after the part has been removed from the gripping unit.

When machining is finished, the gripping unit is taken out of the machine tool and is conveyed to the first loading unloading station or to another station similar to the first loading unloading station. An operator then controls releasing the part using the gripping means 18', 20a and 20b. He does this by making a request to the logic controller installed in box 28b, by taking action on the desk that materializes the control means 50. Advantageously, the above mentioned logic controller controls ejectors that facilitate evacuation of the central unmachined part of block B', held in place by gripping means 18'.

What is claimed is:

1. Part machining device, comprising at least one gripping unit capable of being transferred between at least one machine tool and at least one loading unloading station, to enable automated machining of at least one part, the gripping unit comprising a pallet and means of gripping the said part mounted on the pallet, in which the said unit also comprises orientation means by which the gripping means are mounted on the pallet, control means capable of selecting the orientation means in response to control signals from the machine tool, and bearing means mounted on the pallet by other orientation means, the machining device also comprising at least one machine tool capable of holding the gripping unit, at least one loading unloading station capable of holding the gripping unit and means capable of supplying energy to the gripping unit, in which each machine tool also comprises second control means capable of sending the said control signals and signal transmission means are provided to transmit the said control signals between the gripping unit control means and the second control means, when the gripping unit is held on the machine tool.

2. Machining device according to claim 1 in which the loading unloading station includes third control means capable of sending control signals for the gripping means, and the transmission means are also capable of transmitting control signals for the gripping means when the gripping unit is held at the loading unloading station.

3. Machining device according to claim 2 in which the third control means comprise at least one display means and at least one input means.

4. Machining device according to claim 1 the gripping unit also comprising first connection means capable of being automatically connected to the second connection means mounted on the machine tool when the gripping unit is held in the machine tool, and in which the said transmission means also comprise fourth connection means mounted on the loading unloading station, the said first and fourth connection means being automatically connected to each other when the gripping unit is held on the loading unloading station.

5. Machining device according to claim 1 in which the means capable of supplying energy to the gripping unit comprise at least one energy source installed on the machine tool and energy transmission means to transmit energy between the said energy source and the control means of the gripping unit.

6. Machining device according to claim 5 in which the gripping unit also comprises first connection means capable of being automatically connected to the second connection means installed on the machine tool when the gripping unit is fitted in the machine tool, and in which the first and second connection means also form part of the energy transmission means.

7. Machining device according to claim 1 in which the machine tool is a high speed machining machine.

8. Machining device according to claim 1 in which at least one conveying means is provided to transfer the gripping unit between the machine tool and the loading unloading station.

* * * * *